Patented Jan. 7, 1947

2,413,968

UNITED STATES PATENT OFFICE 2,413,968

PROCESS FOR MANUFACTURE OF N-ALKYL GLYCINES

Alban Thomas Hallowell, Brandywine Hundred, Del., assignor to E. I. du Pont de Nemours & Company, Wilmington, Del., a corporation of Delaware No Drawing. Application October 30, 1944, Serial No. 561,163

3 Claims. (Cl. 260—534)

This invention relates to amino acids and more particularly to N-alkylaminoacetic acids, also referred to as N-alkylglycines.

This invention has as an object the provision of a process for obtaining certain amino acids. A further object is the production of N-alkylaminoacetic acids. A still further object is the production of salts of N-alkylaminoacetic acids. Additional objects will become apparent from an examination of the following description and claims.

These and other objects and advantages are accomplished according to the herein described invention which broadly comprises heating together an aliphatic secondary amine, formaldehyde and carbon monoxide in a dilute acidic aqueous system at a temperature above 100° C., under a carbon monoxide pressure of more than 800 atms. and isolating the N-alkylaminoacetic acid thereby produced.

A preferred embodiment of this invention comprises heating together formaldehyde, carbon monoxide and an amine having the general formula

wherein R and R' represent members of the group consisting of lower alkyl radicals and groups which jointly with the nitrogen form an aliphatic heterocyclic ring. Said heating is effected at a temperature within the range of from 150° C. to 200° C. and under a carbon monoxide pressure within the range of from 800 atms. to 1000 atms. for from 2 to 12 hours, in an aqueous solution containing from 1% to 10% (calculated on the basis of the water present) of a strong acid.

While the reaction mechanism has not yet been completely elucidated, the reaction is represented by the equation

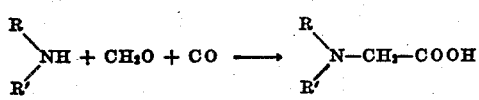

wherein R and R' represent members of the group consisting of alkyl radicals and hydrocarbon groups which jointly with the nitrogen form an aliphatic heterocyclic ring containing at least four $CH_2$ groups.

The following example, in which proportions are in parts by weight unless otherwise specified, is given for illustrative purposes and is not intended to place any restrictions on the herein described invention.

Example

A solution of 60 parts of dimethylamine hydrochloride, 100 parts of 37% aqueous formaldehyde and 45 parts of 8% aqueous hydrochloric acid is heated in a silver-lined oscillating autoclave at 150° C. under 875–900 atmosphere carbon monoxide pressure for 8 hours. The resulting clear liquid reaction product is extracted with ether in a continuous extraction apparatus for 8 hours, which operation removes a small amount of hydroxyacetic acid. The remaining aqueous solution is made alkaline by adding the calculated quantity of sodium hydroxide plus a slight excess, and evaporated to dryness. The solid residue is worked with ether, redissolved in hydrochloric acid, and the solution again evaporated to dryness. Extraction of the dry solid with hot absolute ethanol followed by concentration of the alcohol solution yields 20 parts of white, crystalline, pure dimethylglycine hydrochloride.

*Analyses.*—Calcd. for $C_4H_{10}O_2NCl$=C, 34.4%; H, 7.2%; N, 10.0%; Cl, 25.4%. Found: C, 34.60%; H, 7.21%; N, 10.22%; Cl, 25.67%.

The product is further characterized by its neutralization equivalent of 141 in water (calculated: 139.5 for one acid group) and of 71 in ethanol (calculated: 69.7 for 2 acid groups). It has a melting point of 187–191° C. (corrected) and, when mixed with an authentic sample of dimethylglycine hydrochloride, a mixed melting point of 187–192° C. (corrected).

As hereinbefore stated, the process of the instant invention comprises reacting together an aliphatic secondary amine, formaldehyde and carbon monoxide in a dilute acidic aqueous system at a temperature above 100° C. and under a carbon monoxide pressure of more than 800 atms.

While the said invention has been illustrated with particular reference to the use of dimethylamine, it is to be understood that aliphatic secondary amines having the formula

wherein R and R' represent members of the group consisting of alkyl radicals and hydrocarbon groups which jointly with nitrogen form an aliphatic heterocyclic ring containing at least four $CH_2$ groups, are broadly applicable therein. However, on account of the superior results had therewith, I prefer to employ aliphatic secondary amines having the aforementioned general formula

wherein R and R' are lower alkyl radicals, i. e. alkyl radicals containing not more than six carbon atoms. Included among examples of aliphatic secondary amines which may be employed in the process of this invention are: dimethylamine, diethylamine, methylethylamine, dipropylamine, ethylpropylamine, dibutylamine, dihexylamine, piperidine and the like. The amines may be used as their preformed salts, e. g. as hydrochlorides, or added as such to the dilute acidic aqueous solution. Formaldehyde is desirably used as the commercial aqueous solution, but it may be in the form of a solid polymer such as paraformaldehyde. While the mole ratio of formaldehyde to amine may be varied to a considerable extent, optimum results are had when said ratio is greater than 1/1.

The acidic catalyst may be any strong organic or inorganic acid, i. e. any water-soluble acid having a dissociation constant greater than $1 \times 10^{-2}$, e. g. hydrochloric acid, sulfuric acid, phosphoric acid, hydrated boron trifluoride, trichloroacetic acid and the like. The amount of acid which should be present is not critical, but there should preferably be enough of it to form the salt of the amine and a sufficient excess so that the aqueous solution contains between 1% and 10% by weight of acid, based on the water present. Hydrochloric acid is the preferred acid since it gives well characterized salts of the resulting N-dialkylglycines.

The reaction is unpracticably slow below 100° C. and therefore it should be carried out between that temperature and the decomposition point of the reactants or products. However, on account of the superior yields had when the reaction is effected at a temperature within the range of from 150° C. to 200° C., I prefer to employ a temperature within said range.

For good results, the carbon monoxide pressure should be above 800 atms., and it can be as high as the equipment will stand, a satisfactory range being 800–1000 atms. Any high pressure apparatus is suitable, provided it resists the corrosive action of the acid present. Preferably, an autoclave which permits agitation of the mixture is used. The course of the reaction may be followed by the drop in carbon monoxide pressure. It is unnecessary to prolong the reaction after the calculated amount of carbon monoxide has been absorbed. In general, this will require 2–12 hours at a temperature of 150°–200° C.

The N-dialkylglycines which are present in the reaction mixture as salts of the strong acid used as catalyst may be isolated by any of the methods known to the art. Conveniently, they are isolated as salts, e. g., hydrochlorides, from which the free amino acids may be regenerated by known means. The N-dialkylglycines are useful as corrosion inhibitors, detergents, chemical intermediates, etc.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. The process for obtaining an N-alkylglycine which comprises heating together formaldehyde, carbon monoxide and an amine having the general formula

wherein R and R' are lower alkyl radicals containing not more than six carbon atoms, said heating being effected in a dilute acidic aqueous system containing from 1% to 10%, calculated on the basis of the water present, of a strong acid under a pressure of more than 800 atms. at a temperature within the range of from 100° C. and that at which decomposition of the reactants and products occurs.

2. The process for obtaining an N-alkylglycine which comprises heating together formaldehyde, carbon monoxide and an amine having the general formula

wherein R and R' are lower alkyl radicals, containing not more than six carbon atoms, said heating being effected within the range of from 150° C. to 200° C., under a pressure of at least 800 atms. in an aqueous solution containing from 1% to 10%, calculated on the basis of the water present, of a strong acid.

3. The process for obtaining dimethylglycine which comprises heating together dimethylamine, formaldehyde and carbon monoxide, the mole ratio of formaldehyde to dimethylamine being greater than 1/1, said heating being effected at a temperature within the range of from 150° C. to 200° C. under a pressure within the range of 800 atms. to 1000 atms. in an aqueous solution containing from 1% to 10%, calculated on the basis of the water present, of hydrochloric acid.

ALBAN THOMAS HALLOWELL.